No. 783,772. PATENTED FEB. 28, 1905.
F. BILLINGHAM, DEC'D.
L. P. BILLINGHAM & E. F. GENNERT, EXECUTORS.
GAS FIXTURE.
APPLICATION FILED JULY 23, 1902. RENEWED DEC. 19, 1904.
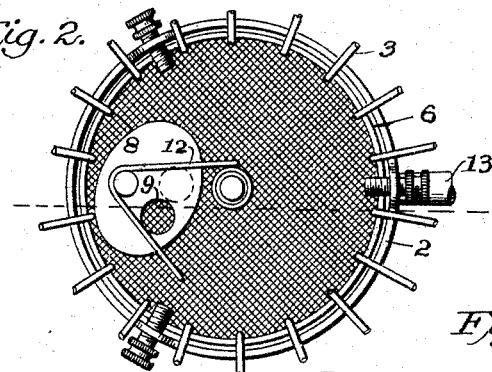
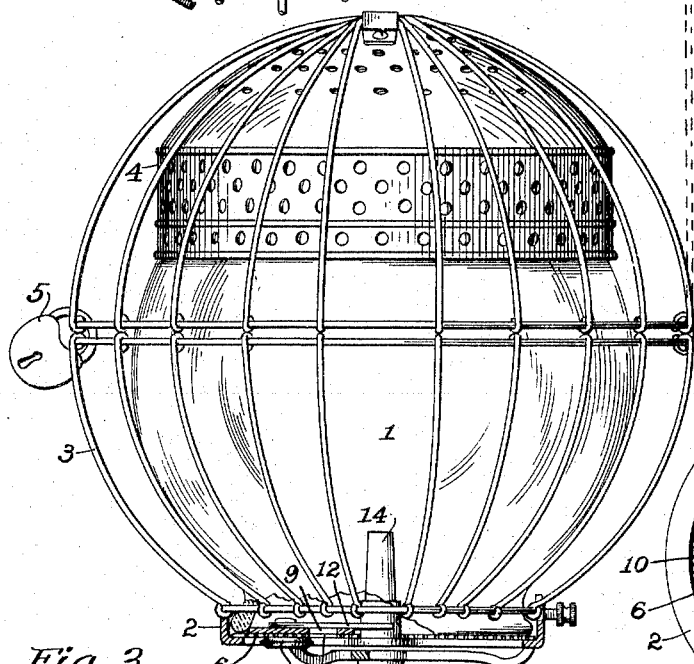
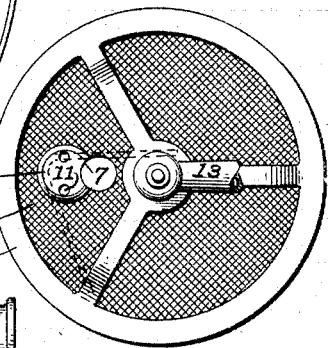
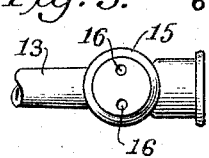
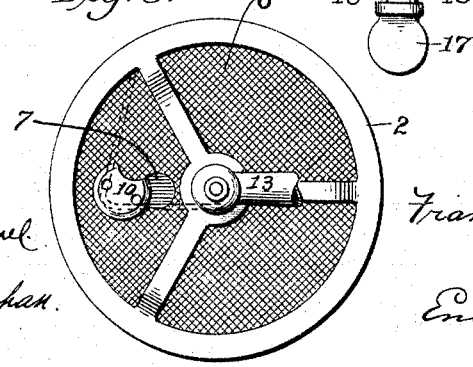
WITNESSES:
James T. Duhamel
William R. Monahan
INVENTOR
Francis Billingham
BY
Ernie F. Gennert
ATTORNEY No. 783,772. Patented February 28, 1905.

UNITED STATES PATENT OFFICE.

FRANCIS BILLINGHAM, OF BROOKLYN, NEW YORK; LOTTIE P. BILLINGHAM AND EMIL F. GENNERT EXECUTORS OF SAID FRANCIS BILLINGHAM, DECEASED; SAID EXECUTORS ASSIGNORS TO LOTTIE P. BILLINGHAM, OF BROOKLYN, NEW YORK.

GAS-FIXTURE.

SPECIFICATION forming part of Letters Patent No. 783,772, dated February 28, 1905.

Application filed July 23, 1902. Renewed December 19, 1904. Serial No. 237,470.

*To all whom it may concern:*

Be it known that I, FRANCIS BILLINGHAM, a citizen of the United States, residing at 267 South Second street, borough of Brooklyn, city of New York, county of Kings, State of New York, have invented a new and useful Improvement in Gas-Fixtures, of which the following is a specification.

My invention relates to gas-fixtures and illuminating appliances for gas, the objects being to produce a complete fixture for the purpose of lighting the halls and staircases of theaters, schools, railroad-stations, and other public places in such a manner that no communication can be had with the flame for the purpose of lighting matches, paper, cigars, and the like, and to provide a protection against drafts, so as to insure a steady flame. These I accomplish by the use of the assembled parts hereinafter described, reference being had to the accompanying drawings, which form part of this specification, wherein—

Figure 1 is a side elevation of my complete invention, the globe-holder and guard being broken away in part. Fig. 2 is a plan view, the globe not shown and the wire guard shown partly broken away. Fig. 3 is an inverted plan view of a gas-cock. Fig. 4 is an inverted plan view of the globe-holder, the slide being open; and Fig. 5 is a similar view, the slide being closed.

The globe 1 is fastened in a globe-holder 2 by the usual screws. A wire guard 3, also resting in the holder under the screws, (see Fig. 1,) incloses the globe 1 and canopy 4, which fits over or onto the upper opening of the globe. The wire guard is divided about half-way, the two parts being hinged or otherwise secured together. A lock 5 may be used to keep the guard closed. The canopy 4 is securely fastened in the upper half of the guard, so that when the latter is raised, as shown by dotted lines in Fig. 1, the canopy leaves its position on the globe.

A perforated disk 6 is placed in the globe-holder under the guard and globe. This disk is provided with an opening 7, which permits the passage of a flame for lighting the gas. An oscillating slide 8, also provided with a hole 9, is mounted on the perforated disk within the globe, the holes 7 and 9 being in line with each other. The slide 8 is fastened to the shank of a flat button 10, which shank passes through the guard 6, the head of the button extending down below it. The head is provided with two holes 11 at diametrically opposite sides of the center near the edge. A bent wire 12 is soldered to the slide 8, which acts as a stop to limit the movement thereof.

The globe-holder is fastened on a gas-bracket 13 in the usual way by means of a gas-burner 14, which is screwed down on a male nipple. The gas-bracket has a gate or cock as usual, except that there is no thumb-piece on the plug. Instead thereof the plug 15 has a disk having a sharp edge. On the face of the disk are two holes 16 at diametrically opposite sides of the center, the distance between these two holes being exactly the same as the holes 11 in the button which controls the slide.

To operate the gas-cock, a separate thumb-piece 17, having two pins 18, which enter the holes of either the slide 8 or the plug 15, is used.

The operation is as follows: We will presume the gas-bracket to be connected with a gas-supply pipe and the globe, &c., in position. To light the gas, use thumb-piece 17, open the slide 8 so that the hole in it will be in line with the hole in the disk 6, as shown in Fig. 4, remove thumb-piece and insert it in the plug 15 of the gas-cock and turn on the gas, pass a lighted match or taper up through the hole in guard and gas will light, close off the opening 7 by moving the slide to position shown in Figs. 2 and 5, and remove the thumb-piece. To clean globe or remove the same, unlock the fastening, raise upper half of guard, back out the globe-holder screws, and the globe can be removed and replaced.

It is found in theaters, schools, and railroad-stations that men about to enter the streets from any of these places stop to light cigars, cigarettes, and pipes at the illuminating gas-jets, using papers and other means to get a light from within the globe, where used to protect the flame from wind, &c. Much danger by the careless use of light so obtained is caused to wearing-apparel and property and by inclosing the flame in the manner described and by the means I employ to accomplish this end these risks are avoided.

What I claim as new, and desire to secure by Letters Patent of the United States, is—

1. In an appliance for illuminating by gas, a bracket provided with a plug having two holes for the insertion of a separate thumb-piece whereby the gas-supply is controlled, a globe-holder, a perforated disk in said globe-holder, provided with an oscillating slide adapted to be manipulated by said separate thumb-piece, a glass globe supported by said globe-holder, a separable wire-guard protector surrounding said globe, and a gas-burner within said globe, all arranged substantially as and for the purpose described.

2. In an appliance for illuminating by gas, a bracket provided with a plug having two holes for the insertion of a separate thumb-piece whereby the gas-supply is controlled, a globe-holder, a perforated disk in said globe-holder, provided with an oscillating slide adapted to be manipulated by said separate thumb-piece, a glass globe supported by said globe-holder, a separable wire-guard protector surrounding said globe, and a gas-burner within said globe, in combination with a separate thumb-piece adapted for manipulating the oscillating slide and the plug of the gas-bracket, substantially as and for the purpose described.

In testimony whereof I have signed my name to this specification, in the presence of two subscribing witnesses, this 11th day of July, 1902.

FRANCIS BILLINGHAM.

Witnesses:
ELIAS WHITNEY,
WILLIAM R. MONAHAN.